3,415,776
STABILIZATION OF RESINS AND PLASTICS
Roy A. White, Somers, Conn., assignor to Litton Business Systems, Inc., a corporation of New York
No Drawing. Filed July 8, 1964, Ser. No. 381,228
12 Claims. (Cl. 260—45.8)

ABSTRACT OF THE DISCLOSURE

A reaction product of a borane compound with a blue to violet triarylmethane dye, the dye having a methyl carbon united by a double bond to one of its three aryl rings. This reaction product, when incorporated into vinyl polymers, has the unexpected property of markedly inhibiting thermal discoloration of such polymers.

---

This invention relates to the protection of resin and plastic polymers and copolymers (hereafter, for convenience, called "polymers") against discoloration during aging, particularly discoloration resulting from high temperatures, and, to some extent at least, from light. The invention is particularly useful in connection with inhibiting the discoloration of chlorine-containing vinyl polymers and copolymers (hereafter, for convenience, called "vinyl polymers").

The principal object of this invention is to provide vinyl polymers effectively stabilized against discoloration in a novel manner, all as is hereafter described in detail.

Another object of this invention is to provide an improved method of manufacturing vinyl polymers whereby the problem of discoloration is eliminated both during and subsequent to the manufacture of the vinyl polymers.

Still another and important object of the invention is the provision of novel reaction products which are effective to prevent discoloration or yellowing of vinyl polymers but which are useful for such and related purposes in connection with various textiles.

The above and other objects and advantages of this invention will be more readily apparent from the following description and claims. The invention will be described particularly in conjunction with vinyl polymers where it has its greatest value.

As is well known, heat is the most critical factor in the manufacture of vinyl polymers because too high temperatures cause thermal discoloration, resulting in an undesirable yellow to brown appearance in the polymers. Numerous approaches to the meeting of this problem have been suggested and employed, the most common of which is to incorporate into the vinyl polymers, as a color stabilizer, against the effects of heat as well as light, metallic salts as, for instance, metallic soaps of higher fatty acids. These prior practices, although reasonably effective, have a number of disadvantages with which those versed in the art are familiar.

The present invention is based upon the discovery that reaction products of boranes with blue to violet triarylmethane dye compounds, when incorporated into vinyl polymers, and especially chlorine-containing vinyl polymers such as polyvinyl chloride plastics or resins, have the unexpected property of markedly inhibiting thermal discoloration of such polymers.

The boranes which are reacted with the triarylmethane dyes to form the color inhibiting reaction products, which reaction products are utilized pursuant to the present invention, may be selected from a large number. As used in the specification and claims, unless otherwise specifically defined, the term "borane" is employed generically to encompass amine boranes (containing the borane group $BH_3$) and alkali metal and quaternary ammonium borohydrides (containing the borohydride group $BH_4$).

The boranes may be represented by the following general formulae:

(I) $\qquad R_3N:BH_3$ where $R_3N$ is a primary, secondary or tertiary amine;

(II) $\qquad MBH_4$ where M is an alkali metal, such as sodium, potassium or lithium, or M can be a quaternary ammonium radical illustrated by the formula

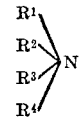

where $R^1$, $R^2$, $R^3$ and $R^4$ are the same or different hydrocarbon radicals, particularly lower molecular weight alkyl radicals such as methyl, ethyl, propyl, isopropyl, butyl, isobutyl, although other hydrocarbon radicals such as benzyl, cyclohexyl, nonyl, dodecyl, tetradecyl, hexadecyl and octadecyl can be present.

The boranes which are represented by Formula I may, as stated previously, be tertiary amine boranes, diamine boranes or monoamine boranes, these subsidiary groups being represented by the following formulae:

(III) $R_3N:BH_3$ (tertiary amine boranes) where $R_3N$ is a tertiary amine.

(IV) $R_2NH:BH_3$ (secondary amine boranes) where $R_2NH$ is a secondary amine.

(V) $RNH_2:BH_3$ (primary amine boranes) where $RNH_2$ is a primary amine.

Illustrative examples of such amine boranes are monomethyl amine borane, dimethyl amine borane, trimethyl amine borane, monoethyl amine borane, diethyl amine borane, triethylamine borane, mono-, di- and tripropyl amine boranes, mono-, di- and tri-isopropyl amine boranes, mono-, di- and tri-butyl amine boranes, mono-, di- and tri-isobutyl amine boranes, monoethanolamine borane, diethanolamine borane, ethylenediamine borane, benzyl amine borane, dodecyl amine borane, morpholine borane, cyclohexyl amine borane, and the like. In the particularly preferred embodiments of the present invention, the pyridine boranes are utilized. Such pyridine boranes comprise pyridine borane itself, or the pyridine ring may be substituted with hydrocarbon radicals, particularly lower molecular weight alkyl radicals. Such pyridine boranes can be represented by the general formula

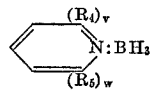

where $R_4$ and $R_5$ are hydrocarbon radicals, notably alkyl radicals and particularly lower alkyl radicals such as methyl, ethyl, propyl, isopropyl, butyl and isobutyl, and $v$ and $w$ are each zero or 1. Among the substituted pyridine boranes are methyl pyridine borane, dimethyl pyridine borane, ethyl pyridine borane, diethyl pyridine borane; propyl-, isopropyl- and butyl-pyridine boranes; and dipropyl-, di-isopropyl- and dibutyl pyridine boranes. In place of the pyridine boranes, boranes of other heterocyclic amines and aromatic amines can be used such as boranes of quinaldine, piperidine, methyl piperidine, pyrrolidine, aniline, and benzyl amine. However, the particularly preferred amine boranes are, generally speaking, pyridine borane, dimethylamine borane, trimethylamine borane, and t-butylamine borane.

Among those boranes which fall within Formula II above, sodium borohydride, tetramethyl ammonium borohydride, tetraethyl ammonium borohydride, tetra-isopropyl ammonium borohydride, and benzyl trimethyl ammonium borohydride are illustrative examples.

For use in the practice of the present invention, the boranes which are reacted with the triarylmethane dyes should preferably be in liquid form or dissolved in a suitable solvent.

The blue to violent triarylmethane dyes, with which the boranes are reacted to form the color inhibiting reaction products, which reaction products are utilized pursuant to the present invention, may also be selected from a large number among which the following are illustrative examples:

(1) 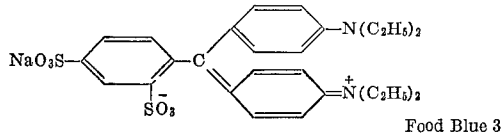
Food Blue 3

(2) 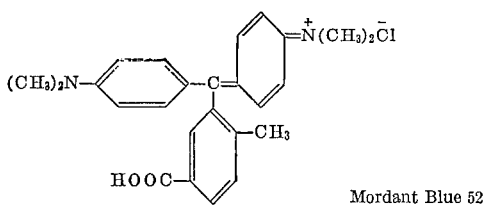
Mordant Blue 52

(3) 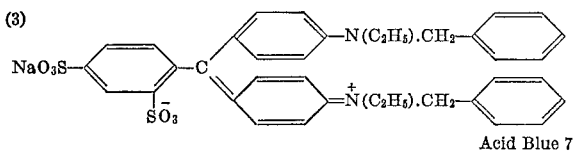
Acid Blue 7

(4) 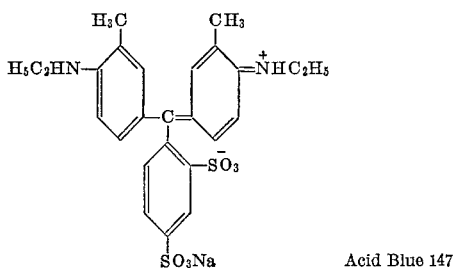
Acid Blue 147

(5) 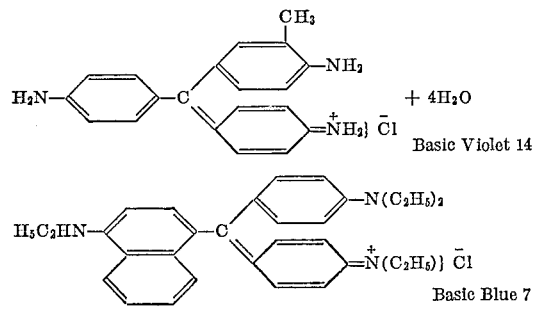
Basic Violet 14

(6) 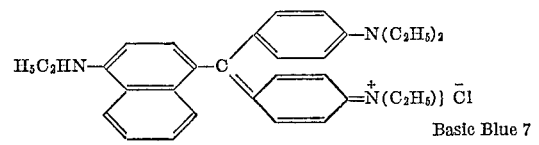
Basic Blue 7

Still others, by way of further example, are Basic Violet 1; Acid Violet 5BL; Acid Violet BWN; Basic Violet 3; Basic Violet 4; Acid Violet 49; Acid Blue 83; Acid Violet 23; Acid Blue 24; Acid Violet 25; Acid Blue 108; Solvent Blue 11; Solvent Blue 4; Acid Violet 24 and Acid Blue 88. The foregoing dyes are identified in the manner set forth above all in accordance with the designations appearing in the Colour Index, 2nd Edition, 1956, volume III of the Society of Dyers and Colourists, pages 3345–80. Again, further illustrative examples of triarylmethane dyes are Sterwin Chemical Parakeet FD & C Blue No. 1; Sterwin Chemical FD & C Blue No. 1 Lake; New Patent Blue 4B (Color Index No. 44020); New Patent Blue GA (Color Index No. 44030); Victoria Blue 4R (Color Index No. 42563) and Mordant Blue 42 (Color Index No. 44100).

The following general dye structure exemplifies at least most of the Blue to violet triarylmethane dyes suitable for purposes of this invention:

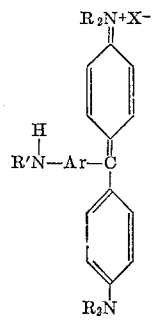

in which
R is selected from the group consisting of H, $CH_3$, $C_2H_5$, $C_3H_7$, and $C_4H_9$;
R' is selected from the group consisting of $CH_3$, $C_2H_5$, and $C_6H_5$;
X is selected from the group consisting of OH, Cl, Br, and $HSO_3$; and
Ar is selected from the group consisting of phenylene in which indicated substituents are in the para position, and naphthylene in which the indicated substituents are in the 1, 4 positions.

The ratios of the borane and the blue to violet triarylmethane dye which are reacted to produce the color inhibitor reaction products may be varied over a broad range, generally 10:1 to 1:10, by weight, the exact ratios for optimum results varying somewhat. It is preferred to utilize weight ratios of borane to said triarylmethane dye in the range of 1:1 to 5:1 with a ratio of about 3:1 being especially desirable in many cases.

The amount of the borane-triarylmethane dye reaction product necessary to effect color inhibition in the vinyl polymer is, in all cases, of very small magnitude, but, in general, depending upon the particular vinyl polymer involved and the extent of color inhibition effected, the range is of the order of from 0.0001 to 0.01 part, and especially from 0.0005 to 0.005 part, per 100 parts of the vinyl polymer, said parts being by weight.

Vinyl polymers into which the borane-triarylmethane dye reaction products are incorporated are many in number and are, generally, well known in the art. The invention, as indicated above, is especially applicable to chlorine-containing vinyl polymers. Illustrative examples of the vinyl polymers are polyvinyl acetate; polyvinyl chloride as, for instance, "Geon"; polyvinyl chloride-acetate copolymers as, for instance, "Vinylite" which is a copolymer of 5% vinyl acetate and 95% vinyl chloride; and polyvinylidene chloride as, for instance, "Saran." The chlorine-containing vinyl polymers are polymers, or copolymers, of unsaturated monomeric compounds containing the group

in which at least one bond is attached to a chlorine atom. The vinyl polymers may be in the form of sheets, films, extrusions and the like, and may contain plasticizers commonly used in vinyl polymers as, for instance, dioctyl phthalate; pigments; and stabilizers of various types. Other resins and plastics to which the invention may be applied are those which tend to discolor or yellow under heat and/or light and fall into the category of various rubbers, polystyrene, impact styrene, polyacrylonitrile, polyesters, polyurethanes, polyamides, and phenolics.

The borane-triarylmethane dye reaction products can be incorporated into the vinyl polymers in any one of a number of ways as, for instance, through organic solvent solutions of said reaction products which are added to the preformed vinyl polymers; or by admixing said reaction products with a vinyl formulation prior to the production of the finished formulation; or, in certain cases, by adding the borane and the blue to violet triarylmethane dye separately to the vinyl polymer and forming the reaction product in situ in the production of the final vinyl polymer. In this last case, for instance, the borane and the blue to violet triarylmethane dye can be added separately to the vinyl polymer or the vinyl polymer, plasticizer and pigment, and treated in the manner described below in Example III, the borane concentration being increased, if necessary, to compensate for volatilization losses and dilution effects.

The precise structure of the borane-triarylmethane dye reaction products, which, in themselves, are believed to be novel compositions, has not been ascertained but it would appear that a semi-stable complex is formed. It is, therefore, preferred to characterize the products which are formed simply as reaction products of the stated materials. Furthermore, the exact mechanism by which said reaction products bring about inhibition of discoloration of the vinyl polymers when the latter are subjected to elevated temperatures, particularly in the manufacture of the vinyl polymer formulations, has not been determined. It is known in the art to incorporate blue or violet dyes, as such, into vinyl polymers to neutralize the yellowing tendency of said polymers, but such dyes generally impart an undesirable blue or violet tint or coloration to the vinyl polymers which is particularly noticeable and objectionable in white vinyl plastics or resins. By the utilization of the borane-triarylmethane dye reaction products, however, the imparting of a blue or violet color to the vinyl polymer is essentially eliminated or markedly reduced and, as stated, resistance to discoloration of the vinyl polymer is enhanced.

The following examples are illustrative of several embodiments of the practice of the present invention and, since various changes may be made in the light of the guiding principles and teachings contained herein, it will be understood that they are not to be construed in any way as limitative of the invention. In the said examples, a conventional vinyl polymer formulation was prepared comprising polyvinyl chloride resin and a dioctyl phthalate plasticizer, together with various conventional stabilizers and pigments. To these formulations were added various borane-triarylmethane dye reaction products. All "parts" referred to are by weight.

EXAMPLE I

The reaction product of pyridine borane and a triphenyl methane blue dye was prepared by mixing 0.44 gm. (0.001 mol) of triphenylmethane blue dye (known commercially as "Du Pont Victoria Blue B0, Colour Index Solvent Blue 5") dissolved in 21 gm. of isopropanol, with 0.30 gm. (0.003 mol) pyridine borane. After standing 17 hours at room temperature, the solution was evaporated, first under air and then under vacuum, and the solid product was stored in a sealed vial in the absence of air.

EXAMPLE II

A reaction product of pyridine borane with a triphenylmethane violet dye was prepared by mixing 0.40 gm. (0.001 mol) of triphenylmethane violet dye (known commercially as "General Dyestuff Methyl Violet XXA, Colour Index Basic Violet I,") dissolved in 21 gm. of isopropanol, with 0.30 gm. (0.003 mol) pyridine borane. After standing 3 days at room temperature, the solution was evaporated, first under air and then under vacuum, and the solid product was stored in a sealed vial in the absence of air.

EXAMPLE III 100 parts polyvinyl chloride resin were mixed with 50 parts dioctyl phthalate plasticizer, 5 parts titanium dioxide pigment, and 1 part organo-tin mercaptide stabilizer. To a separate portion of the same mix was added 0.001 part of the pyridine borane-triphenyl-methane violet dye reaction product prepared in Example II. These 2 mixes were separately fused on a differential speed two-roll mill for 7 minutes at 300° F. to form homogeneous sheets of plastic. They were finally aged 45 minutes in a 365° F. circulating air oven.

| Pyridine borane-triphenylmethane violet dye reaction product | Color of milled sheet | Color after oven aging |
|---|---|---|
| 0 | Slight yellowish white | Yellow. |
| 0.001 | Cold white | White. |

Addition of the pyridine borane-triphenylmethane violet dye reaction product stabilized the polyvinyl chloride resin and prevented discoloration both during hot milling and during subsequent oven aging.

EXAMPLE IV 100 parts polyvinyl chloride resin were mixed with 45 parts dioctyl phthalate plasticizer, 5 parts epoxidized soybean oil plasticizer stabilizer, and 2 parts barium-cadmium soap stabilizer. To separate portions of the same mix were added 0.001 part of the pyridine borane-triphenylmethane dye reaction product prepared in Examples I and II. These 3 mixes were fused on a differential speed two-roll mill for 7 minutes at 300° F. to form homogeneous sheets of plastic. They were finally aged 8 hours in a 300° F. circulating air oven.

| Pyridine borane-triphenylmethane violet dye reaction product | Color of milled sheet | Color after oven aging |
|---|---|---|
| None | Yellowish white | Brownish white. |
| Blue | Very slight blue tint | Bluish. |
| Violet | White | Ivory. |

Addition of the pyridine borane-triphenylmethane dye reaction product, particularly the violet one, stabilized the polyvinyl chloride resin and inhibited discoloration both during hot milling and during subsequent oven aging.

What I claim as new and desire to protect by Letters Patent of the United States of America is:

1. A polymer, normally subject to discoloration under elevated temperatures, said polymer being selected from the group consisting of polyvinyl chloride, polyvinylidene chloride, polystyrene, polyacrylonitrile, polyester, polyurethane, polyamide, phenolic resin and copolymer of polyvinyl chloride and vinyl acetate, said polymer containing a reaction product of a compound with a blue to violet triarylmethane dye to inhibit such discoloration, said reaction product being present by weight in an amount of not less than .0001 part to 100 parts of said vinyl polymer, the weight ratio of said compound to said dye being in the range of 10:1 to 1:10, said compound selected from the group consisting of those having the formula:

$$R_3N:BH_3$$

wherein $R_3N$ is selected from the group consisting of primary, secondary and tertiary amines; said blue to violet triarylmethane dye corresponding to the following formula:

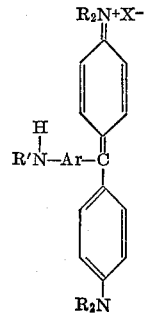

in which

R is selected from the group consisting of H, CH₃, C₂H₅, C₃H₇ and C₄H₉;

R' is selected from the group consisting of CH₃, C₂H₅ and C₆H₅;

X is selected from the group consisting of OH, Cl, Br, and HSO₃; and

Ar is selected from the group consisting of phenylene in which the indicated substituents are in the para position, and naphthylene in which the indicated substituents are in the 1, 4 positions.

2. A polymer, normally subject to discoloration under elevated temperatures, said polymer being selected from the group consisting of polyvinyl chloride, polyvinylidene chloride, polystyrene, polyacrylonitrile, polyester, polyurethane, polyamide, phenolic resin and copolymer of polyvinyl chloride and vinyl acetate, said polymer containing a reaction product of a compound with a blue to violet triarylmethane dye to inhibit such discoloration, said reaction product being present by weight in an amount not less than .0001 part to 100 parts of vinyl polymers, the weight ratio of said compound to said dye being in the range of 10:1 to 1:10, said compound selected from the group consisting of those having the formula:

MBH₄ wherein M is selected from the group consisting of sodium, potassium, lithium and a quaternary ammonium radical, said quaternary ammonium radical having the formula:

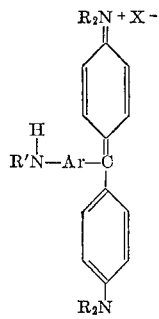

wherein R¹, R², R³ and R⁴ are each selected from the group consisting of methyl, ethyl, propyl, isopropyl, butyl, isobutyl, benzyl, cyclohexyl, nonyl, dodecyl, tetradecyl, hexadecyl and octadecyl, said blue to violet triarylmethane dye corresponding to the following formula:

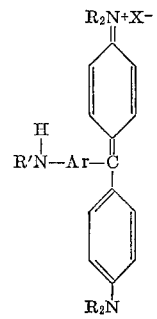

in which

R is selected from the group consisting of H, CH₃, C₂H₅, C₃H₇ and C₄H₉;

R' is selected from the group consisting of CH₃, C₂H₅ and C₆H₅;

X is selected from the group consisting of OH, Cl, Br, and HSO₃; and

Ar is selected from the group consisting of phenylene in which the indicated substituents are in the para position, and naphthylene in which the indicated substituents are in the 1, 4 positions, 3. A polymer, normally subject to discoloration under elevated temperatures, said polymer being selected from the group consisting of polyvinyl chloride, polyvinylidene chloride, polystyrene, polyacrylonitrile, polyester, polyurethane, polyamide, phenolic resin and copolymer of polyvinyl chloride and vinyl acetate, said polymer containing a reaction product of a heterocyclic compound with a blue to violet triphenylmethane dye to inhibit such discoloration, said reaction product being present by weight in an amount not less than .0001 part to 100 parts of vinyl polymer, the weight ratio of said heterocyclic compound to said dye being in the range of 10:1 to 1:10, said heterocyclic compound selected from the group consisting of pyridine borane, methyl pyridine borane, dimethyl pyridine borane, ethyl pyridine borane, diethyl pyridine borane, propyl pyridine borane, isopropyl pyridine borane and butyl pyridine borane, said blue to violet triarylmethane dye corresponding to the following formula:

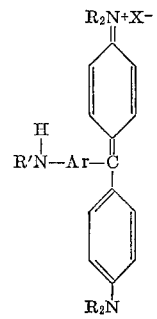

in which

R is selected from the group consisting of H, CH₃, C₂H₅, C₃H₇ and C₄H₉;

R' is selected from the group consisting of CH₃, C₂H₅ and C₆H₅;

X is selected from the group consisting of OH, Cl, Br, and HSO₃; and

Ar is selected from the group consisting of phenylene in which the indicated substituents are in the para position, and naphthylene in which the indicated substituents are in the 1, 4 positions, 4. A chlorine containing vinyl polymer, normally subject to discoloration under elevated temperatures, which contains a reaction product of a compound and a blue to violet triarylmethane dye, said reaction product being present by weight in an amount of at least .0001 part to 100 parts of vinyl chloride polymer, the weight ratio of siad compound to said dye being in the range of 10:1 to 1:10, said dye corresponding to the following formula:
in which

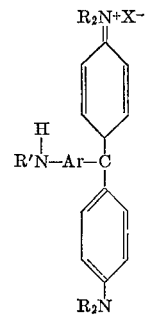

R is selected from the group consisting of H, CH₃, C₂H₅, C₃H₇ and C₄H₉;

R' is selected from the group consisting of CH₃, C₂H₅ and C₆H₅;

X is selected from the group consisting of OH, Cl, Br, and HSO₃; and

Ar is selected from the group consisting of phenylene in which the indicated substituents are in the para position, and naphthylene in which the indicated substituents are in the 1, 4 positions, said compound selected from the group consisting of those having the formula:

R₃N:BH₃ wherein R₃N is selected from the group consisting of primary, secondary and tertiary amines.

5. A chlorine containing vinyl polymer, normally subject to discoloration under elevated temperatures, which contains a reaction product of a compound and a blue to violet triarylmethane dye, said reaction product being present by weight in an amount not less than .0001 part to 100 parts of vinyl, the weight ratio of said compound to said dye being in the range of 10:1 to 1:10, said dye corresponding to the following formula:

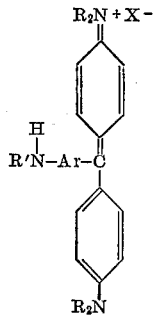

in which
  R is selected from the group consisting of H, $CH_3$, $C_2H_5$, $C_3H_7$ and $C_4H_9$;
  R' is selected from the group consisting of $CH_3$, $C_2H_5$ and $C_6H_5$;
  X is selected from the group consisting of OH, Cl, Br, and $HSO_3$; and
  Ar is selected from the group consisting of phenylene in which the indicated substituents are in the para position, and naphthylene in which the indicated substituents are in the 1, 4 positions, said compound selected from the group consisting of those having the formula:

$$MBH_4$$

wherein M is selected from the group consisting of sodium, potassium, lithium and a quaternary ammonium radical, said quaternary ammonium radical having the formula:

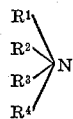

wherein $R^1$, $R^2$, $R^3$ and $R^4$ are each selected from the group consisting of methyl, ethyl, propyl, isopropyl, butyl, isobutyl, benzyl, cyclohexyl, nonyl, dodecyl, tetradecyl, hexadecyl and octadecyl.

6. A chlorine containing vinyl polymer, normally subject to discoloration under elevated temperatures, which contains a reaction product of a compound and a blue to violet triarylmethane dye, said reaction product being present by weight in an amount of not substantially less than .0001 part to 100 parts of vinyl chlorine polymer, the weight ratio of said compound to said dye being in the range of 10:1 to 1:10, said dye corresponding to the following formula:

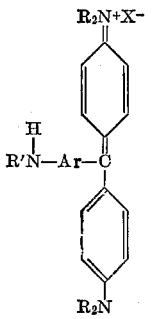

in which
  R is selected from the group consisting of H, $CH_3$, $C_2H_5$, $C_3H_7$ and $C_4H_9$;
  R' is selected from the group consisting of $CH_3$, $C_2H_5$ and $C_6H_5$;
  X is selected from the group consisting of OH, Cl, Br, and $HSO_3$; and
  Ar is selected from the group consisting of phenylene in which the indicated substituents are in the para position, and naphthylene in which the indicated substituents are in the 1, 4 positions, said compound selected from the group consisting of pyridine borane, methyl pyridine borane, dimethyl pyridine borane, ethyl pyridine borane, diethyl pyridine borane, propyl pyridine borane, isopropyl pyridine borane and butyl pyridine borane.

7. A reaction product of a compound with a blue to violet triarylmethane dye, said dye corresponding to the following formula:

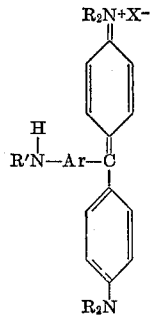

in which
  R is selected from the group consisting of H, $CH_3$, $C_2H_5$, $C_3H_7$ and $C_4H_9$;
  R' is selected from the group consisting of $CH_3$, $C_2H_5$ and $C_6H_5$;
  X is selected from the group consisting of OH, Cl, Br, and $HSO_3$; and
  Ar is selected from the group consisting of phenylene in which the indicated substituents are in the para position, and naphthylene in which the indicated substituents are in the 1, 4 positions, the weight ratio of said compound to said dye being in the range of 10:1 to 1:10, said compound selected from the group consisting of those having the formula:

$$R_3N:BH_3$$

wherein $R_3N$ is selected from the group consisting of primary, secondary and tertiary amines.

8. A reaction product of a compound with a blue to violet triarylmethane dye, said dye corresponding to the following formula:

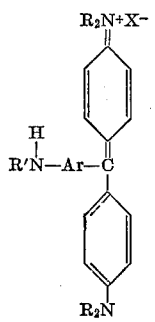

in which
  R is selected from the group consisting of H, $CH_3$, $C_2H_5$, $C_3H_7$ and $C_4H_9$;
  R' is selected from the group consisting of $CH_3$, $C_2H_5$ and $C_6H_5$;
  X is selected from the group consisting of OH, Cl, Br, and $HSO_3$; and
  Ar is selected from the group consisting of phenylene in which the indicated substituents are in the para position, and naphthylene in which the indicated substituents are in the 1, 4 positions, the weight ratio of said compound to said member being in the range of 10:1 to 1:10, said compound selected from the group consisting of those having the formula:

$$MBH_4$$

wherein M is selected from the group consisting of sodium, potassium, lithium and a quaternary ammonium radical, said quaternary ammonium radical having the formula:

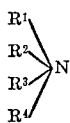

wherein $R^1$, $R^2$, $R^3$ and $R^4$ are each selected from the group consisting of methyl, ethyl, propyl, isopropyl, butyl, isobutyl, benzyl, cyclohexyl, nonyl, dodecyl, tetradecyl, hexadecyl and octadecyl.

9. A reaction product of a compound with a blue to violet triarylmethane dye, said dye corresponding to the following formula:

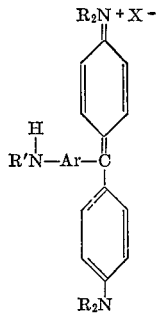

in which
R is selected from the group consisting of H, $CH_3$, $C_2H_5$, $C_3H_7$ and $C_4H_9$;
R' is selected from the group consisting of $CH_3$, $C_2H_5$ and $C_6H_5$;
X is selected from the group consisting of OH, Cl, Br, and $HSO_3$; and
Ar is selected from the group consisting of phenylene in which the indicated substituents are in the para position, and naphthylene in which the indicated substituents are in the 1, 4 positions,
the weight ratio of said compound to said member being in the range of 10:1 to 1:10, said compound selected from the group consisting of pyridine borane, methyl pyridine borane, dimethyl pyridine borane, ethyl pyridine borane, diethyl pyridine borane, propyl pyridine borane, isopropyl pyridine borane and butyl pyridine borane.

10. A reaction product of a compound with a dye, said dye comprising a blue to violet triarylmethane dye having a methyl carbon united by a double bond to one of its three aryl rings, the weight ratio of said compound to said member being in the range of 10:1 to 1:10, said compound selected from the group consisting of those having the formula:

$$R_3N:BH_3$$

wherein $R_3N$ is selected from the group consisting of primary, secondary and tertiary amines.

11. A reaction product of a compound with a dye, said dye comprising a blue to violet triarylmethane dye having a methyl carbon united by a double bond to one of its three aryl rings, the weight ratio of said compound to said member in the range of 10:1 to 1:10, said compound selected from the group consisting of those having the formula:

$$MBH_4$$

wherein M is selected from the group consisting of sodium, potassium, lithium and a quaternary ammonium radical, said quaternary ammonium radical having the formula:

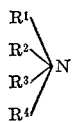

wherein $R^1$, $R^2$, $R^3$ and $R^4$ are each selected from the group consisting of methyl, ethyl, propyl, isopropyl, butyl, isobutyl, benzyl, cyclohexyl, nonyl, dodecyl, tetradecyl, hexadecyl and octadecyl.

12. A reaction product of a compound with a dye, said dye comprising a blue to violet triarylmethane dye having a methyl carbon united by a double bond to one of its three aryl rings, the weight ratio of said compound to said member being in the range of 10:1 to 1:10, said compound selected from the group consisting of pyridine borane, methyl pyridine borane, dimethyl pyridine borane, ethyl pyridine borane, diethyl pyridine borane, propyl pyridine borane, isopropyl pyridine borane and butyl pyridine borane.

References Cited

UNITED STATES PATENTS

| | | |
|---|---|---|
| 1,890,154 | 12/1932 | Ingram. |
| 1,930,051 | 10/1933 | Howland. |
| 3,011,992 | 12/1961 | Anderson. |
| 3,011,991 | 12/1961 | Anderson. |
| 2,726,252 | 12/1965 | Balon et al. |

DONALD E. CZAJA, *Primary Examiner.*

V. P. HOKE, *Assistant Examiner.*

U.S. Cl. X.R.

260—23, 45, 75, 45.7, 45.9, 247, 283, 290, 293, 326.8, 386, 388, 391, 392, 31.8, 32.2